United States Patent [19]
Luenberger

[11] 3,965,766
[45] June 29, 1976

[54] VARIABLE DRIVE PULLEY CONSTRUCTION

[75] Inventor: Frederick O. Luenberger, Stratford, Conn.

[73] Assignee: Emerson Electric Co., St. Louis, Mo.

[22] Filed: June 23, 1975

[21] Appl. No.: 589,041

[52] U.S. Cl............................ 74/230.17 A; 74/230.5
[51] Int. Cl.² ................... F16H 55/52; F16H 55/36
[58] Field of Search............ 74/230.17 A, 230.17 R, 74/230.17 E, 230.5, 230.17 B, 230.17 C

[56] References Cited
UNITED STATES PATENTS

| | | | |
|---|---|---|---|
| 2,543,337 | 2/1951 | Salsbury | 74/230.17 B |
| 2,613,545 | 10/1952 | Reeves | 74/230.17 A |
| 3,583,250 | 6/1971 | Kongelka | 74/230.5 |

Primary Examiner—Samuel Scott
Assistant Examiner—A. Russell Burke
Attorney, Agent, or Firm—Polster and Polster

[57] ABSTRACT

In a variable speed drive having a drive pulley and a driven pulley, both of the pulleys having at least one disc movable axially with respect to another disc making up the pulley, the pulleys being housed in an enclosure with an enclosure wall adjacent the perimeter-defining outer edge of the rim of the pulley, a plurality of substantially chordal flats are provided in the perimeter-defining outer edge of the rim of at least one disc, the flats being arranged symmetrically about the axis of rotation of the pulley.

4 Claims, 7 Drawing Figures

VARIABLE DRIVE PULLEY CONSTRUCTION

BACKGROUND OF THE INVENTION

In variable speed drives having a drive pulley and a driven pulley connected by a modified V-belt, an example of which is sold under the trademark VARIBELT by the U.S. Electrical Motors Division of Emerson Electric Co., the pulleys are housed in an enclosure which is made as compact as possible, because the variable speed drive is inevitably a part of a larger system, and therefore it is desirable to make the amount of space it occupies as small as possible.

One of the limitations imposed on the width of the housing in a direction perpendicular to the drive shafts is the clearance required to permit the removal and installation of drive belts.

One of the objects of this invention is to provide a construction of one or both pulleys which will permit the use of a narrower housing than is conventional for a given diameter pulley or will provide additional clearance between the pulley and the standard housing for purposes of removing and installing belts.

Other objects will become apparent to those skilled in the art in the light of the following description and accompanying drawing.

SUMMARY OF THE INVENTION

In a variable speed drive having a drive pulley and a driven pulley, both of the pulleys having at least one disc movable axially with respect to another disc making up the pulley, the discs having a rim, at least one of the pulleys being housed in an enclosure with an enclosure wall adjacent the perimeter-defining outer edge of the rim of the pulley, a plurality of substantially chordal flats are provided in the perimeter-defining outer edge of the rim of at least one disc of at least one pulley, the flats being arranged symmetrically about the axis of rotation of the pulley.

DESCRIPTION OF THE PREFERRED EMBODIMENT

Figure 1:
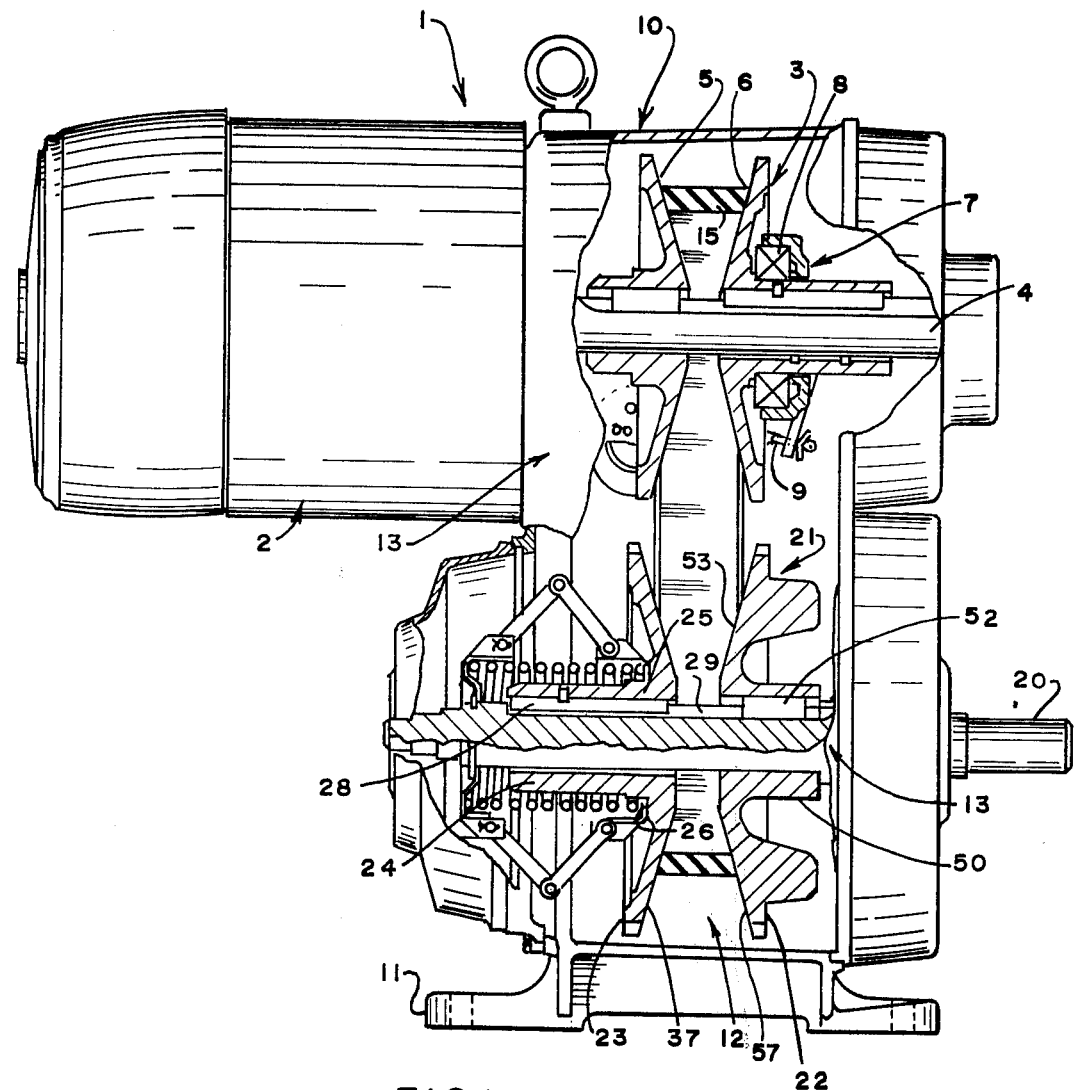
FIG. 1 is a view in side elevation, partly broken away and partly in section, of a variable speed drive in which the driven pulley is constructed in accordance with one embodiment of this invention.

Referring now to FIG. 1, reference numeral 1 indicates a variable speed drive of the type sold under the trademark VARIDRIVE by U.S. Electrical Motors Division of Emerson Electric Co. It includes a frame and housing 10, supported by a base 11. The housing 10 has vertical substantially planar side enclosure walls 12 and 13. A drive motor 2 is mounted on the frame. The drive motor 2 in this embodiment has a drive shaft 4, extending into and journalled in bearings in the housing, to which a drive pulley 3 is keyed. Mounted in bearings in the lower part of the housing 10, is a driven shaft 20, on which a driven pulley 21 is mounted. A conventional variable speed drive cogged or ribbed V-belt 15 extends between and around the pulleys 3 and 21.

The drive pulley 3 is made up of a fixed disc 5, which is keyed to the shaft 4 for rotation therewith but fixed against axial movement, and a movable disc 6, also keyed to the shaft for rotation therewith, but movable axially thereof. The movable disc 6 is shifted axially with respect to the fixed disc 5 by conventional shifting mechanism 7 which includes bearings 8 and a control chain 9 by which the disc 6 is forced mechanically toward the fixed disc.

The driven pulley 21 is made up of a fixed disc 22 and a movable disc 23. The fixed disc is mounted on the shaft 20 for rotation therewith and fixed against axial movement with respect to the shaft. The movable disc 23, which is also mounted on the shaft for rotation therewith, is movable axially with respect to the shaft and fixed disc 22.

The fixed disc 22 in this embodiment has a hub 50 projecting axially in a direction away from a ground, tapered face side 57 of a web 53, radially extending ribs 54 on the side of the web 53 from which the hub projects and blades 55, projecting in the same direction as the hub 50. The perimeter of the disc 22 is defined by a rim 58. The hub 50 is provided with a keyway 51 in which a key 52, a part of which is mounted in a keyway 29 in the shaft 20, is seated. All of these elements are conventional, except for the construction of the rim 58.

Figure 2:
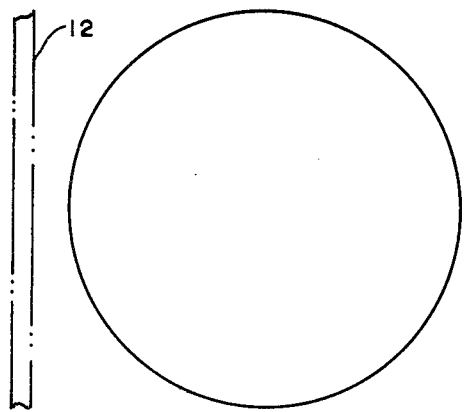
FIG. 2 is a diagrammatic representation of a conventional pulley between conventional enclosure walls.

Conventionally the rim 58 is circular in elevation, as indicated diagrammatically in FIG. 2. In the construction of the illustrative embodiment shown, four flats 56, each substantially chordal and positioned symmetrically at four quadrants, are provided in the rim 58.

The movable disc 23 has a hub 25 with which a sleeve 24 is integral. The sleeve 24 projects in a direction away from a ground face side 37 of a web 40. The hub 25 is stepped to provide a shoulder 26 with a radially flat face. The sleeve 24 is provided with a keyway 27 which accommodates a key 28 which is slidably mounted in the keyway 29 of the shaft 20.

On the side of the web opposite the ground face side 37, the web 40 is provided with radially extending ribs 41, extending from the hub 25 to a rim 44. The outer edge of the rim 44 defines the perimeter of the disc.

All of the elements of the disc 23 as described are conventional except for the provision in the rim 44 of substantially chordal flats 45, positioned symmetrically at four quadrants, and aligned with the flats 56 of the fixed disc 22.

Figure 3:
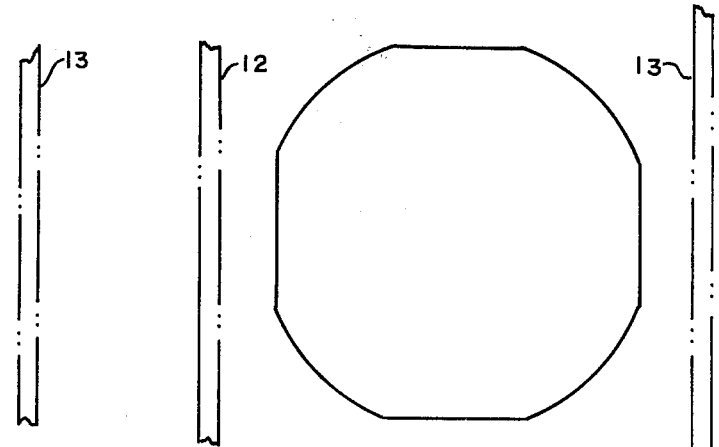
FIG. 3 is a diagrammatic representation of a pulley disc constructed in accordance with one embodiment of this invention, between enclosure walls.
Figures 4, 5:
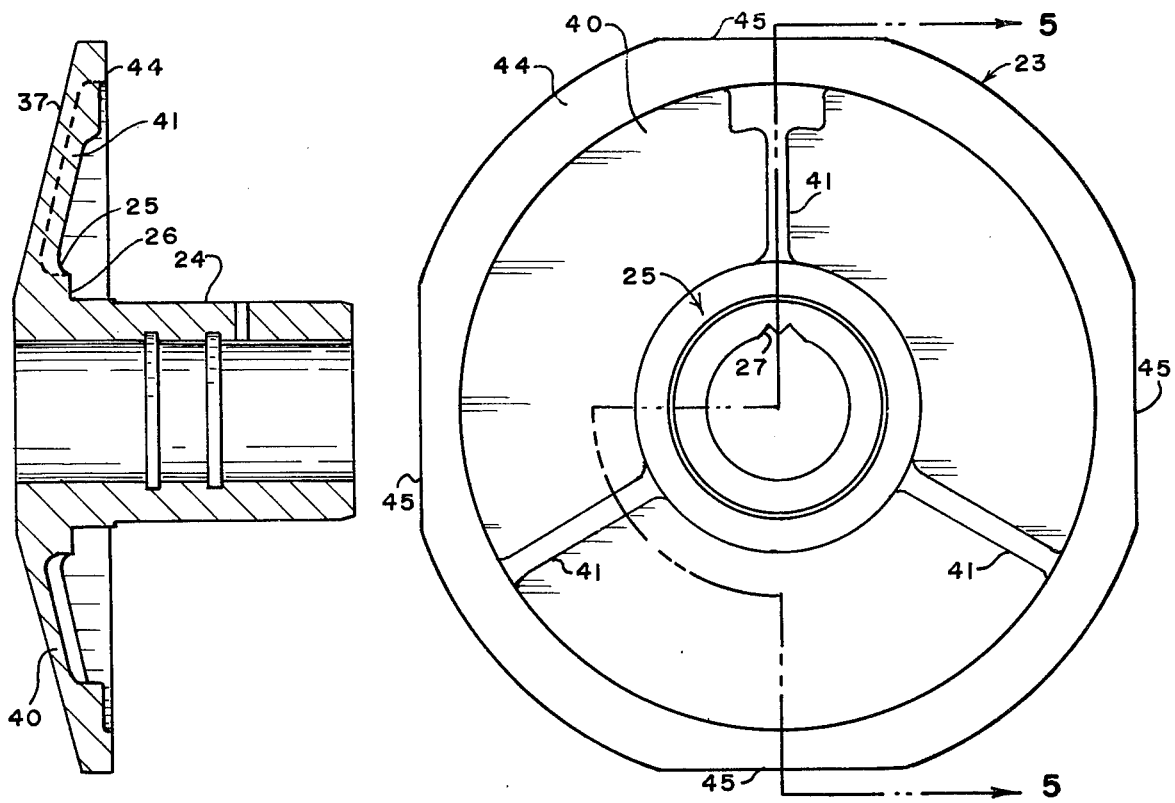
FIG. 4 is an enlarged detail elevational view in a direction from left to right as viewed in FIG. 1 of the movable disc of the driven pulley shown in FIG. 1.
FIG. 5 is a sectional view taken along the line 5—5 of FIG. 4.
Figure 6:
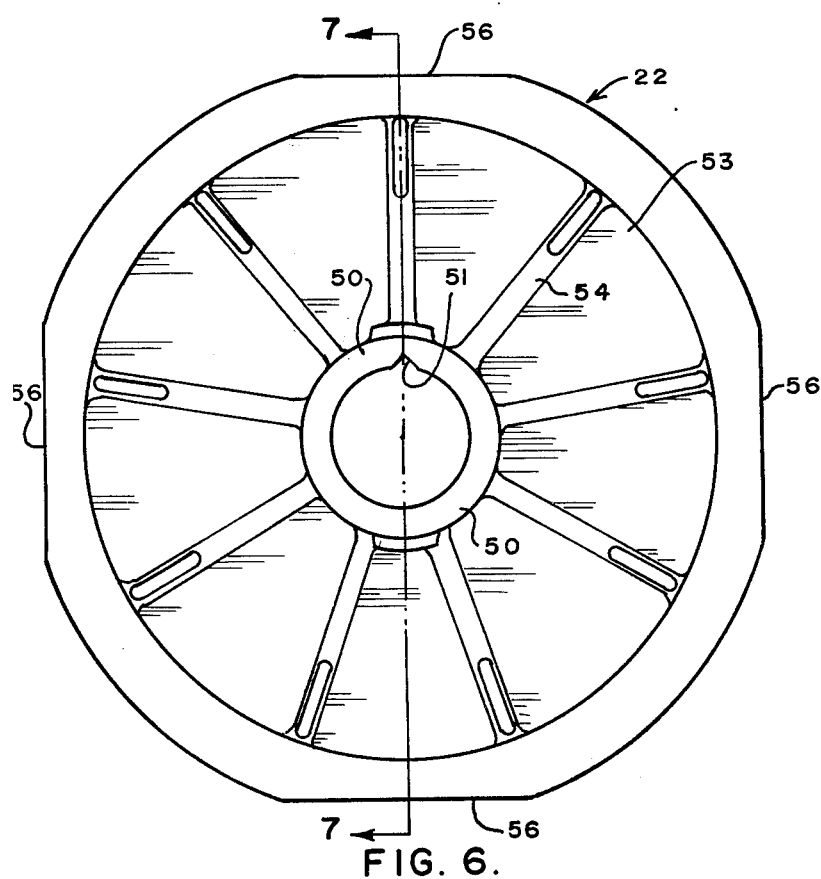
FIG. 6 is an enlarged detail elevational view in a direction from right to left as viewed in FIG. 1 of the fixed disc of the driven pulley shown in FIG. 1.
Figure 7:
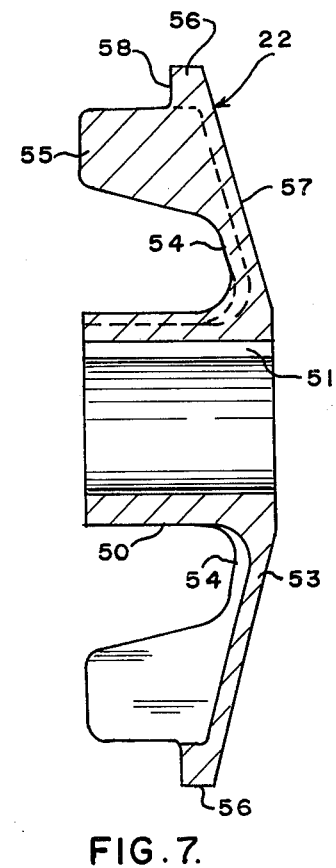
FIG. 7 is a sectional view taken along the line 7—7 of FIG. 6.

As is illustrated in FIG. 3, the provision of the flats either produces more effective space between the periphery of the discs and the side walls of the housing, along the flats, or permits the housing walls to be moved closer to one another. In the first case, if the diameter of the disc remains the same, it makes removing and installing belts easier. Alternatively, the extra space can be utilized to increase the diameter of the pulley. In the second case, it permits the use of a narrow housing, thus conserving machine space.

It has been found, that, contrary to what might have been expected, the flatting does not reduce the effective diameter of the pulley.

Merely by way of illustration, and not of limitation, a 10¼ inches disc can be provided with flats 11/32 inch deep at their center point, making the distance from flat to opposite flat 9 9/16 inches. Such a pulley would normally be used with a belt approximately 2 inches wide and ½ inch thick.

Numerous variations in the construction of the device of this invention, within the scope of the appended claims, will occur to those skilled in the art in the light of the foregoing disclosure. Merely by way of illustration, flats can be provided on only a single disc of the pair of discs making up a pulley, as, for example, on the movable disc of the driven pulley, or on discs of both the driven and drive pulleys. Different numbers of flats can be provided, such as 2, 3, or 5, as long as they are symmetrically arranged with respect to the axis of rotation, so that the pulley is balanced. These variations are merely illustrative.

Having thus described the invention, what is claimed and desired to be secured by Letters Patent is:

1. In a variable speed drive having a drive pulley and a driven pulley, both of said pulleys having at least one disc movable axially with respect to another disc making up said pulley, said discs having a rim, at least one of said pulleys being housed in an enclosure with an enclosure wall adjacent the perimeter-defining outer edge of the rim of said pulley, the improvement comprising a plurality of substantially chordal flats in the perimeter-defining outer edge of the rim of at least one pulley, said flats being arranged symmetrically about the axis of rotation of said pulley.

2. The improvement of claim 1 wherein both of the discs of a pulley are provided with flats.

3. The improvement of claim 1 wherein four flats are provided on said disc.

4. The improvement of claim 2 wherein the discs of both pulleys are provided with flats.

* * * * *

UNITED STATES PATENT OFFICE
CERTIFICATE OF CORRECTION

Patent No. 3,965,766     Dated  June 29, 1976

Inventor(s)   Frederick O. Luenberger

It is certified that error appears in the above-identified patent and that said Letters Patent are hereby corrected as shown below:

Claim 1, line 13, "perimeter-defining outer edge of the rim of at least one pulley" should read "perimeter-defining outer edge of the rim of at least one disc of at least one pulley"

Signed and Sealed this

Fourteenth Day of September 1976

[SEAL]

Attest:

RUTH C. MASON
*Attesting Officer*

C. MARSHALL DANN
*Commissioner of Patents and Trademarks*